(12) United States Patent
Goldberg

(10) Patent No.: US 10,856,526 B2
(45) Date of Patent: Dec. 8, 2020

(54) SIZE-ADJUSTABLE ANIMAL PAW BOOT AND METHOD FOR DONNING

(71) Applicant: Sharon Goldberg, New York, NY (US)

(72) Inventor: Sharon Goldberg, New York, NY (US)

( * ) Notice: Subject to any disclaimer, the term of this patent is extended or adjusted under 35 U.S.C. 154(b) by 0 days.

(21) Appl. No.: 16/357,618

(22) Filed: Mar. 19, 2019

(65) Prior Publication Data
US 2020/0296929 A1 Sep. 24, 2020

(51) Int. Cl.
*A01K 13/00* (2006.01)
*A43B 3/26* (2006.01)
*A43C 11/14* (2006.01)

(52) U.S. Cl.
CPC ............. *A01K 13/007* (2013.01); *A43B 3/26* (2013.01); *A43C 11/1493* (2013.01)

(58) Field of Classification Search
CPC ....... A01K 13/007; A01K 13/006; A43B 3/26
USPC ............................................. 36/111; 119/850
See application file for complete search history.

(56) References Cited

U.S. PATENT DOCUMENTS

| | | | |
|---|---|---|---|
| 4,458,431 A * | 7/1984 | Sinclair | A43B 11/00 36/111 |
| 5,495,828 A * | 3/1996 | Solomon | A01K 13/007 119/850 |
| 6,186,097 B1 | 2/2001 | Brockmann | |
| 6,470,832 B1 | 10/2002 | Peacock | |
| 6,526,920 B1 | 3/2003 | Griffin | |
| 7,971,557 B2 | 7/2011 | Paxton | |
| 2005/0188925 A1 * | 9/2005 | Yun | A01K 13/007 119/850 |
| 2005/0241188 A1 * | 11/2005 | Yun | A01K 13/007 36/111 |
| 2007/0074677 A1 * | 4/2007 | Behme | A01K 13/007 119/850 |
| 2007/0175410 A1 * | 8/2007 | Vogelman | A01K 13/00 119/850 |
| 2009/0094864 A1 * | 4/2009 | Ketzenberg | A01K 13/007 36/111 |
| 2014/0360053 A1 * | 12/2014 | Morris | A01K 13/007 36/111 |
| 2016/0106066 A1 * | 4/2016 | Montgomery | A01K 13/007 36/111 |

* cited by examiner

*Primary Examiner* — Marie D Bays
(74) *Attorney, Agent, or Firm* — Vincent G. LoTempio; David T. Stephenson

(57) ABSTRACT

A size-adjustable animal paw boot and method for donning provides a paw boot that fits over the paw and lower leg portion of a dog. The boot includes a tubular body member having a paw portion with a bottom side, a top side, and a closed end. The paw portion is sized to surround a paw of an animal. The body member also includes a lower leg portion having an open end that surrounds the lower leg of animal. A cable joins to the lower leg portion for wrapping around and fastening the body member to the lower leg of the animal. An adjustable sole overlays the bottom side of the body member, and is fixedly wrappable to reposition along the bottom and top sides of paw portion for accommodating narrow and wide paws. Hook and loop fasteners wrap around the paw to secure the sole to the paw portion.

16 Claims, 10 Drawing Sheets

SIZE-ADJUSTABLE ANIMAL PAW BOOT AND METHOD FOR DONNING

FIELD OF THE INVENTION

The present invention relates generally to a size-adjustable animal paw boot and method for donning the boot on a paw. More so, the present invention relates to a paw boot that fits over the paw and lower leg portion of an animal; whereby the boot includes a tubular body member having a paw portion with a bottom side, a top side, and a closed end; whereby the paw portion is sized to surround a paw of an animal; whereby the body member also includes a lower leg portion having an open end that surrounds the lower leg of animal; whereby a cable joins to the lower leg portion for wrapping around and fastening the body member to the lower leg of the animal; whereby an adjustable sole overlays the bottom side of the body member, and is fixedly wrappable to reposition along the bottom and top sides of the paw portion for accommodating narrow and wide paws; and whereby hook and loop fasteners wrap around the paw to secure the sole to the paw portion.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, an animal paw is the foot of a quadruped, such as a dog, that has claws. The paw is characterized by thin, pigmented, keratinised, hairless epidermis covering subcutaneous collagenous and adipose tissue, which make up the pads. These pads act as a cushion for the load-bearing limbs of the animal. The paw generally has a heart-shaped metacarpal or palmar pad or metatarsal or plantar pad. The paw is generally four load-bearing digital pads, although there can be five or six toes in the case of domestic cats. It is also significant to note that the front paws of the dog, a fifth claw, is the dew claw. Dew claws can splay at an extreme angle when the dog is walking, and one of the benefits of this design of the present invention is that the dew claw is allowed to move quite naturally in the space between the flaps which attach to the front panel, and the cable which wraps around the lower part of the limb.

In many instances, it can be advantageous to don a boot or sock onto the paw. Such paw covering are easier to use than what might be required to thoroughly clean the dog's feet. In other instances, a dog may have injured one or more paws, and so may not have the usual toughness. In such case, the paw sock or boot can be used to protect the affected paw until the paw has healed sufficiently. It is also known that the pad on the paw may be inadequate for traversing the ground when temperatures are particularly severe or environments inhospitable, such as in the case of ice, slush, salt, chemical ice-melting agents and other irritants. For example, search, rescue, and K9 dogs are exposed to a particularly harsh course or environment, and so may also need special protection.

Other proposals have involved boots that fit onto a paw of a dog or cat. The problem with these paw coverings is that they are not adjustable to accommodate both wide paws and narrow paws. Also, they bottom section is not often reinforced with a durable sole material. Those that are reinforced with a durable sole material tend to be very stiff and don't allow the dog to feel the ground under his/her feet. The present invention is unique in that it has a durable sole that is soft enough for the dog to feel what they're walking on, adapts to the contours of the paw underside better than stiff soles, and thus helps with stability and maintenance of a natural gait while walking. Thus, the dog is not walking awkwardly or slipping.

Even though the above cited paw cover devices meets some of the needs of the market, a paw boot that fits over the paw and lower leg portion of an animal; whereby the boot includes a tubular body member having a paw portion with a bottom side, a top side, and a closed end; whereby the paw portion is sized to surround a paw of an animal; whereby the body member also includes a lower leg portion having an open end that surrounds the lower leg of animal; whereby a cable joins to the lower leg portion for wrapping around and fastening the body member to the lower leg of the animal; whereby an adjustable sole overlays the bottom side of the body member, and is fixedly wrappable to reposition along the bottom and top sides of the paw portion for accommodating narrow and wide paws; and whereby hook and loop fasteners wrap around the paw to secure the sole to the paw portion, is still desired.

SUMMARY

Illustrative embodiments of the disclosure are generally directed to a size-adjustable animal paw boot and method for donning the boot on a paw. The paw boot fits over the paw and lower leg portion of an animal. The paw boot includes a tubular body member having a bottom side, a top side, a closed end, and an open end. The tubular body member is also defined by a paw portion that is operative to surround the paw of the animal, and a lower leg portion operative to surround the lower leg of the animal. A cable joins to the open end of the body member for securely fastening the lower leg portion of the body member to the lower leg of the animal.

The paw boot further includes an adjustable sole that is fabricated from a durable, friction pad material. The sole overlays the bottom side of the tubular body member. The sole is resilient, and thereby can be positioned across the bottom side and paw portion to accommodate various sizes of paws. The resilient, yet pliable material composition also allows the sole to adjust to a narrow paw or a relatively wider paw.

A pair of hook and loop fastener straps affixed to the sole wrap around the paw. The hook and loop fastener straps fasten to a corresponding hook and loop panel on the body member. The hook and loop fastener straps detachably attach to a corresponding hook and loop panel on the paw portion of the body member, so as to secure the sole to the bottom side of the body member at the desired position on the paw. The sole is adjustable across various sections of the paw portion to accommodate variously sized and dimensioned paws. The sole is also sufficiently flexible to be manipulated for optimal coverage and comfort of various sizes of paws.

In one aspect, a size-adjustable animal paw boot, comprises:

a body member defined by a paw portion having a bottom side, a top side, and a closed end, the paw portion being operative to surround the paw of the animal, the body member further being defined by a lower leg portion having an open end, the lower leg portion operative to surround the lower leg of the animal;

a cable joined to the body member, the cable being operable to at least partially wrap around the open end of the lower leg portion, whereby the lower leg portion of the body member secures to the lower leg;

a hook and loop fastener panel affixed to the paw portion;

an adjustable sole overlaying the paw portion, the sole being defined by a resilient material, the sole being operable to rest across the bottom and top sides of the paw portion, whereby the sole is adjustable to accommodate the size and dimensions of the paw; and a pair of hook and loop fastener straps joined to the sole, the fastener straps operable to wrap around the body member and detachably attach to the hook and loop fastener panel, whereby the hook and loop fastener straps fixedly fasten the sole over the paw portion, whereby the hook and loop fastener straps fixedly fasten the closed end of the paw portion to the paw.

In another aspect, the body member has a tubular shape.

In another aspect, the body member comprises a resilient material.

In another aspect, the cable joins with the lower leg portion.

In another aspect, the cable is flexible.

In another aspect, the hook and loop fastener panel is affixed to the lower leg portion.

In another aspect, the hook and loop fastener panel is defined by a rectangular shape, but can take other shapes. In one embodiment, two top corners can be snipped off at 45° angles so that it's more pleasing to look at without harming functionality.

In another aspect, the sole overlays the bottom side of the paw portion.

In another aspect, the sole comprises a durable, friction pad material.

In another aspect, the sole comprises rubber.

In another aspect, the hook and loop fastener straps lie in a V-shaped position.

In another aspect, the paw is a dog paw.

One objective of the present invention is to protect the paws of an animal from snow, ice, debris, and other irritants.

Another objective is to allow the dew claw to move quite naturally in the space between the flaps which attach to the front panel, and the cable which wraps around the lower part of the limb.

Another objective is to provide a durable sole that is soft enough for the dog to feel what they're walking on, adapts to the contours of the paw underside better than stiff soles, and thus helps with stability and maintenance of a natural gait while walking. Thus, the dog is not walking awkwardly or slipping.

Another objective is to provide an animal paw boot that is adjustable to accommodate both narrow paws and wide paws.

Yet another objective is to enable quick release wearing of the paw boot through use of hook and loop fasteners.

An exemplary objective is to enable the adjustable sole to freely move around the paw portion before securing into a fixed position, so as to accommodate both narrow and wide paws.

Additional objectives are to provide an easy to use paw boot for dogs, cats, hooved animals, and the like.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 2A shows a wide paw, and FIG. 2B shows a narrow paw, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
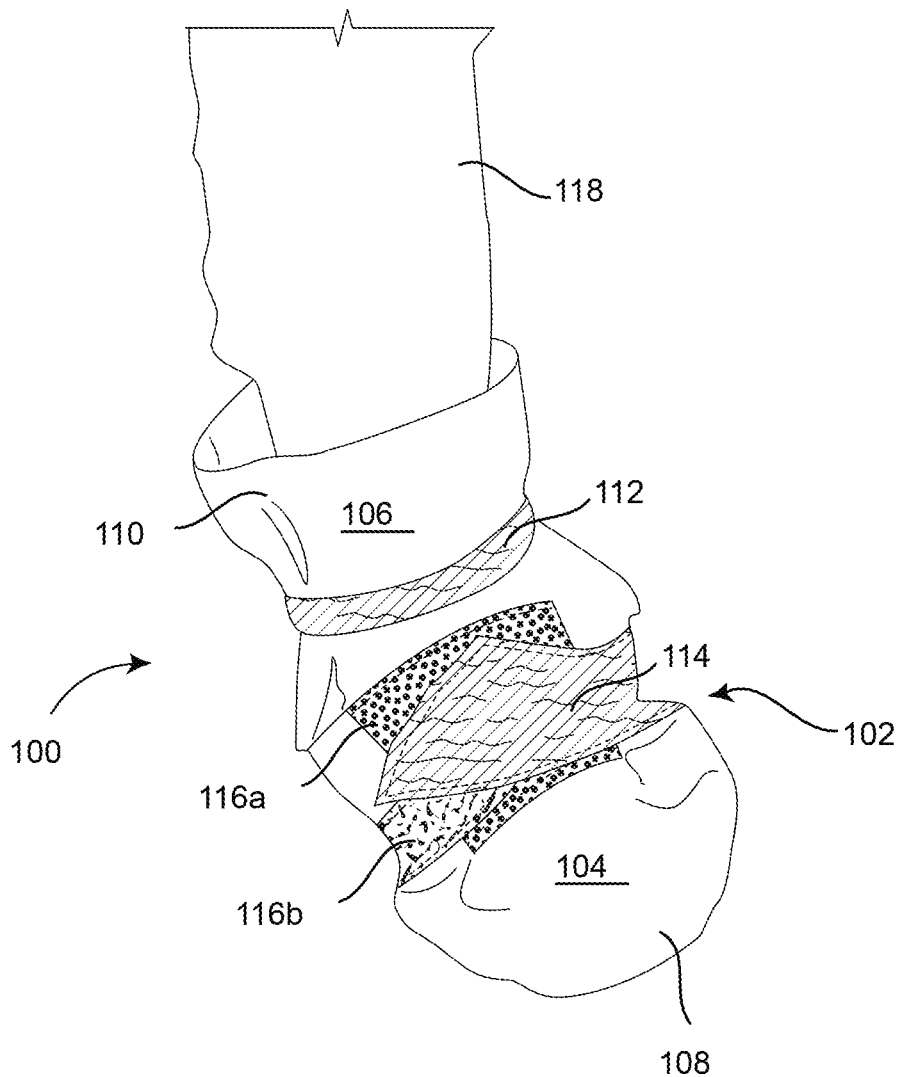
FIG. 1 illustrates a perspective view of an exemplary size-adjustable animal paw boot donned onto a paw, in accordance with an embodiment of the present invention.

FIGS. 1-6 reference a size-adjustable animal paw boot 100 and method 600 for donning the boot 100 on a paw 200a-b of an animal. As FIG. 1 illustrates, the size-adjustable animal paw boot 100, hereafter "boot 100" is configured for insertion and removal of a paw and part of a lower leg of an animal in such a manner that the boot 100 is operatively covering and protecting the paw 200a-b from debris, snow, ice, extreme temperatures, insects, and irritants.

Figures 2A, 2B:
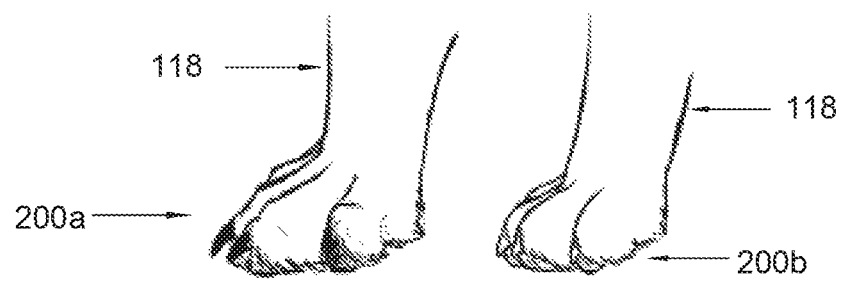
FIGS. 2A and 2B illustrates perspective views of an animal paw, where

The boot 100 is unique in that an adjustable sole 402 overlays the bottom side 400 of the boot 100. The adjustable sole 402 is free to reposition along different sections of the boot 100. The adjustable sole 402 is also sufficiently resilient to snugly wrap around the paw. In this manner, the repositioning capacity and flexibility of the sole 402 allow the boot 100 to accommodate, both a wide paw 200a, shown in FIG. 2A, and a narrow paw 200b, as depicted in FIG. 2B. This multi-size and shape fit helps save time and money, as a single boot 100 can accommodate multiple sizes and types of animals.

For purposes of donning the boot 100, the paw 200a-b may be of an animal, including, without limitation, a dog, a cat, a bear, and other animals having a soft foot-like lower leg region of a mammal, generally a quadruped, that has claws. Further, the paw is characterized by thin, pigmented, keratinised, hairless epidermis covering subcutaneous collagenous and adipose tissue, which make up the pads. The boot 100 is configured to substantially cover the paw 200a-b to protect against debris, snow, ice, moisture, and irritants.

Figure 3:
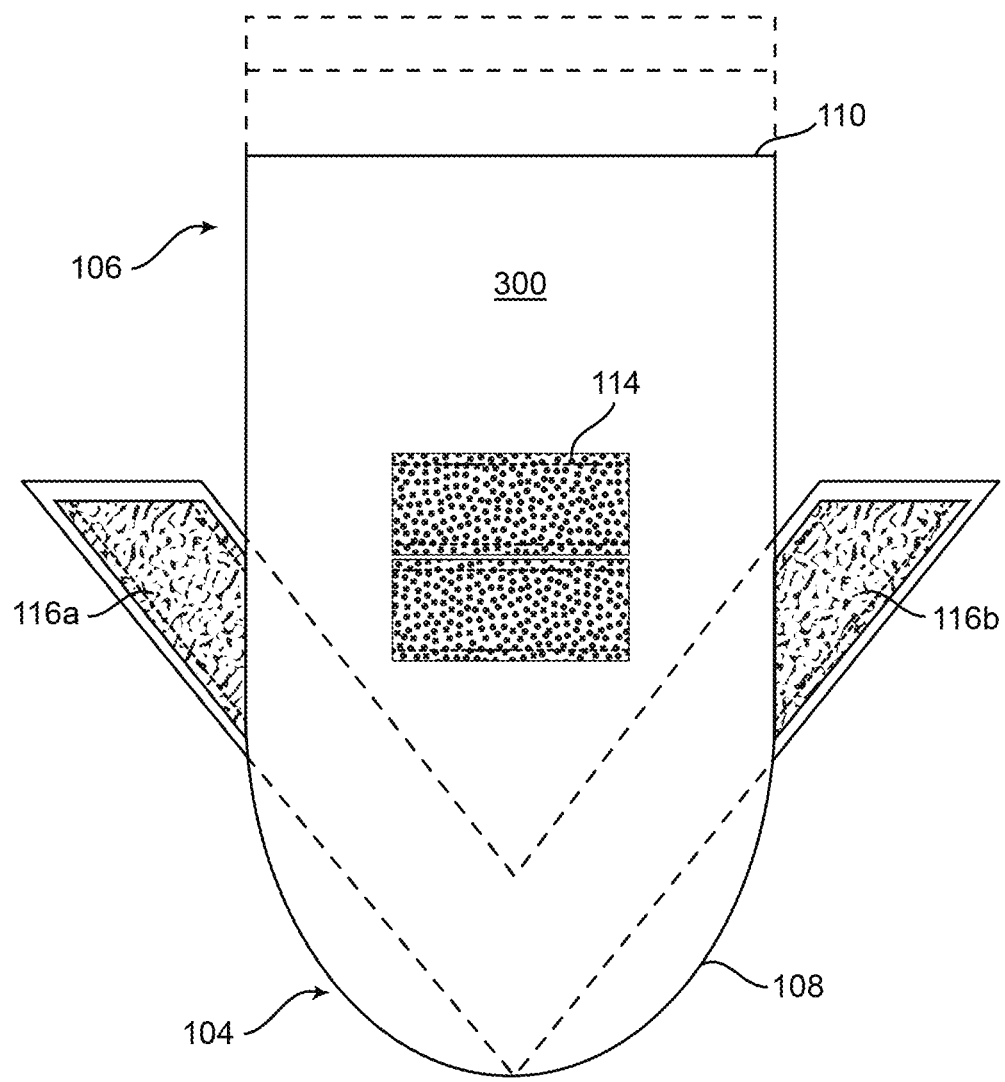
FIG. 3 illustrates a front perspective view of the size-adjustable animal paw boot, showing the hook and loop fastener straps, in accordance with an embodiment of the present invention.

Turning now to the front perspective view of the boot 100 in FIG. 3, the boot 100 includes a body member 102 that provides substantially most of the material that covers the paw 200a. The body member 102 has a tubular shape designed to be fitted over the paw 200a and lower leg 118 of the animal. In some embodiments, the body member 102 may be fabricated from a resilient and breathable material that is easy to don onto the paw 200a, and comfortable for the animal.

As the front view of the boot 100 in FIG. 3 illustrates, the body member 102 is defined by a paw portion 104 that substantially covers the paw 200a-b of the animal. The paw portion 104 has a bottom side 400 that engages and orients towards a ground surface when donned on the paw. The paw portion 104 also has a top side 300 opposite the bottom side 400. The bottom and top sides 400, 300 are bifurcated sections of the paw portion 104. The paw portion 104 also has a closed end 108 to which the paw engages when fully donned. The closed end 108 may be stitched or form a unitary panel 114. As discussed above, the paw portion 104, when fully pulled onto the paw, completely surrounds the paw of the animal.

Continuing, the body member 102 is also defined by a lower leg portion 106 that extends up from the paw portion 104. The lower leg portion 106 has an open end 110 through which the paw passes when donning or removing the body member 102. The lower leg portion 106 substantially surrounds the lower leg 118 of the animal. It is the lower leg portion 106 that can be pulled and tugged to help adjust the positon and orientation of the paw portion 104 and lower leg portion 106 on their respective parts of the paw 200a and lower leg 118.

Figure 4:
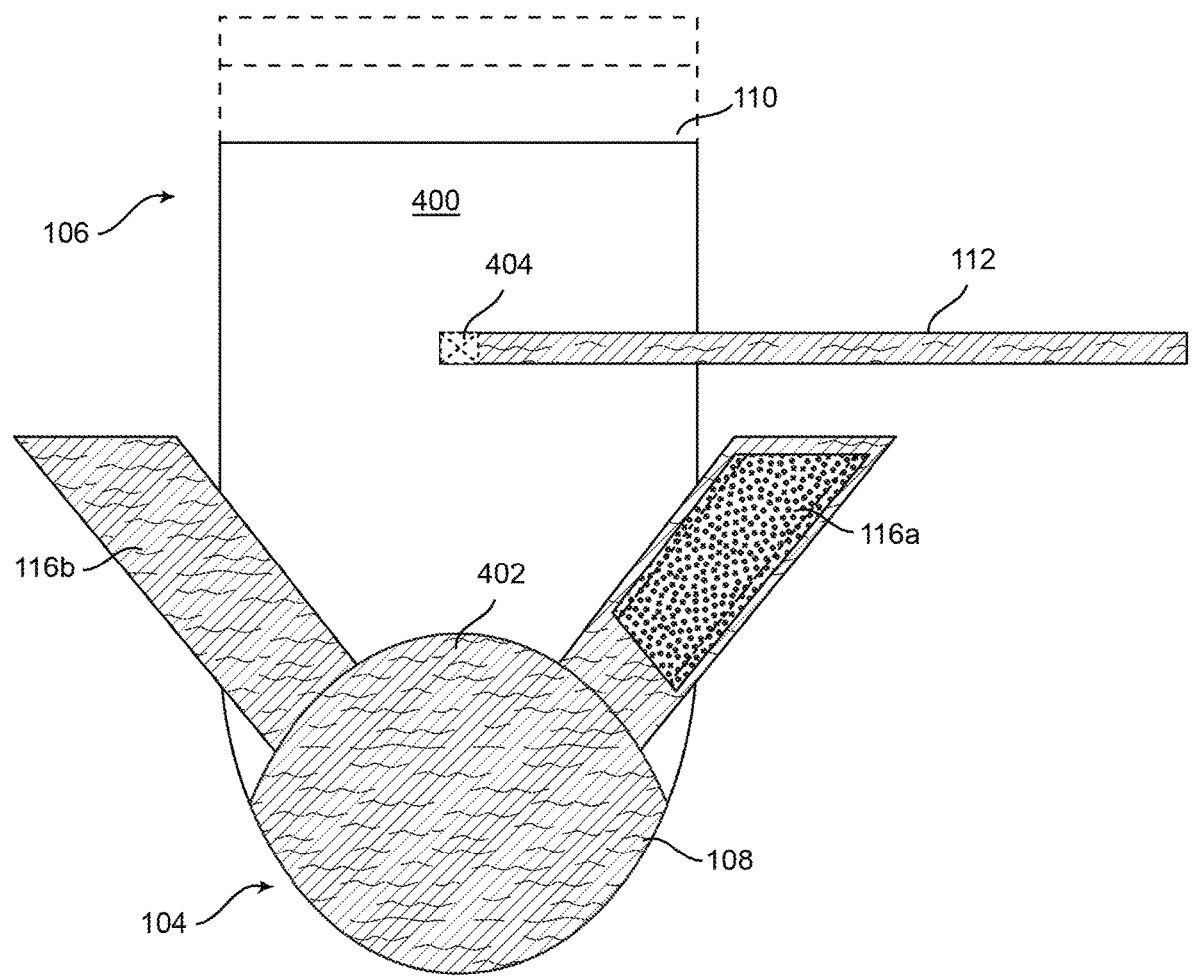
FIG. 4 illustrates a front perspective view of the size-adjustable animal paw boot, showing the sole, cable, hook and loop panel, and hook and loop fastener straps, in accordance with an embodiment of the present invention.

Turning now to FIG. 4, the boot 100 may utilize a cable 112 that joins to the body member 102 for securing the lower leg portion 106 of the body member 102 to the lower leg 118 of the animal. The cable 112 is configured to fixedly join with the lower leg portion 106 at a cable anchor 404. The cable 112 helps retain the lower leg portion 106 of the body member 102 to the lower leg at a desired snugness, as the cable can be adjustably tightened around the lower leg portion 106. In one non-limiting embodiment, the cable 112 joins with the lower leg portion 106, so as to wrap around the lower leg of the animal and secure the lower leg portion 106 to the lower leg. A knot can be formed, or other fastening means, such as buttons, slots, friction fits, hook and loop fasteners, and the like can be used to secure the terminus of the cable 112. The cable 112 is configured to be pulled out, and then wrapped around the open end 110 of the lower leg portion 106. Thus, for such flexible utility, the cable 112 has to be sufficiently flexible, like a rubber band or other flexible material.

The boot 100 may further include a hook and loop fastener panel 114 that affixes to the paw portion 104. The hook and loop fastener panel 114 is used for detachable attachment with corresponding hook and loop fastener straps 116a-b to secure an adjustable sole 402 to the body member 102, and the paw portion 104 to the paw, as discussed below. In one non-limiting embodiment, the hook and loop fastener panel 114 is affixed to the lower leg portion 106. The hook and loop fastener panel 114 may have a rectangular shape, and be sufficiently sized to receive the hook and loop fastener straps 116a-b. The relative large size of the hook and loop fastener panel 114 allows for multiple, quick readjustments of the hook and loop fastener straps 116a-b to accommodate wider and narrower paws.

The boot 100 also provides an adjustable sole 402 that overlays the paw portion 104. The sole 402 provides the primary protection for the bottom of the paw 200a of the animal. The sole 402 is also position-adjustable to fit onto variously sized paws. For example, large dogs and small dogs have different paws. And dogs and cats have differently sized and shaped paws. Thus, the sole 402 has unique characteristics that enable fitting onto different sizes and shapes of paws without interchanging the boot 100.

In one non-limiting embodiment, the sole 402 overlays the bottom side 400 of the paw portion 104. The sole 402 is defined by a resilient material that allows the sole 402 to wrap around the paw, whether the paw is wide 200a, or narrow 200b. Additionally, since the sole 402 is independent of the body member 102, the sole 402 can rest across the bottom and top side 300s of the paw portion 104. In this manner, the sole 402 is adjustable to accommodate the size and dimensions of the paw 200a-b. In one non-limiting embodiment, the sole 402 comprises a durable, friction pad material that provides optimal protection for the paw. Suitable materials for the sole 402 may include, without limitation, rubber, polyethylene, polyurethane, and a resilient polymer.

Turning now to FIG. 4, the boot 100 also includes a pair of hook and loop fastener straps 116a-b that are joined to the sole 402 from a fixed end. The hook and loop fastener straps 116a-b lie in a V-shape when extended, and not in use. However, the hook and loop fastener straps 116a-b are operable to extend, and wrap around the paw portion 104 of the body member 102. Once wrapped around the paw portion 104 in this manner, the hook and loop fastener straps 116a-b may then attach to the aforementioned hook and loop fastener panel 114 on the body member 102.

In this capacity, the hook and loop fastener straps 116a-b fixedly fasten the sole 402 over the paw portion 104. And in a second utility, the hook and loop fastener straps 116a-b fixedly fasten the closed end 108 of the paw portion 104 to the paw 200a. The detachable attachability from the use of a hook and loop fastening means allows the fastener straps 116a-b to be fastened multiple times about the fastener panel 114. This helps create an optimal fit of the boot 100 on the paw.

As FIGS. 5A-5E illustrate, the process of donning the boot 100 onto the paw 200a is relatively straightforward. Also, once donned, the steps of adjusting the sole 402 to the size and shape of the paw, and securing the paw portion and lower leg portion 106 to the animal are tool-free steps that require minimal skill or knowledge.

Figure 6:
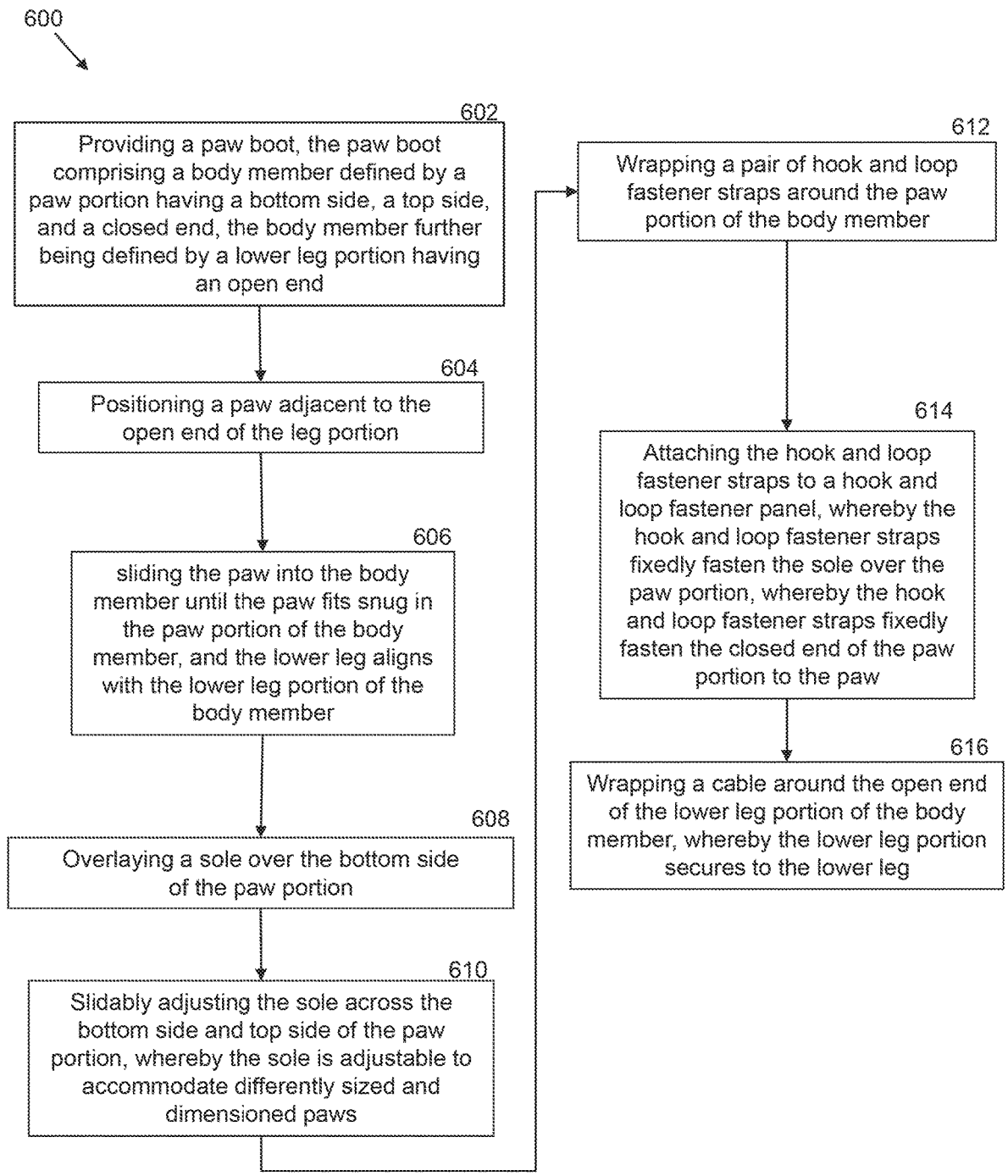
FIG. 6 illustrates a flowchart of an exemplary method for donning the boot on a paw of an animal, in accordance with an embodiment of the present invention.

For example, FIG. 6 illustrates a flowchart diagram of an exemplary method 600 for donning an animal paw boot. The method 600 may include an initial Step 602 of providing a paw boot, the paw boot comprising a body member defined by a paw portion having a bottom side, a top side, and a closed end, the body member further being defined by a lower leg portion having an open end. As described above, the structural component of the boot 100 minimize confusion when donning onto the paw.

Figure 5A:
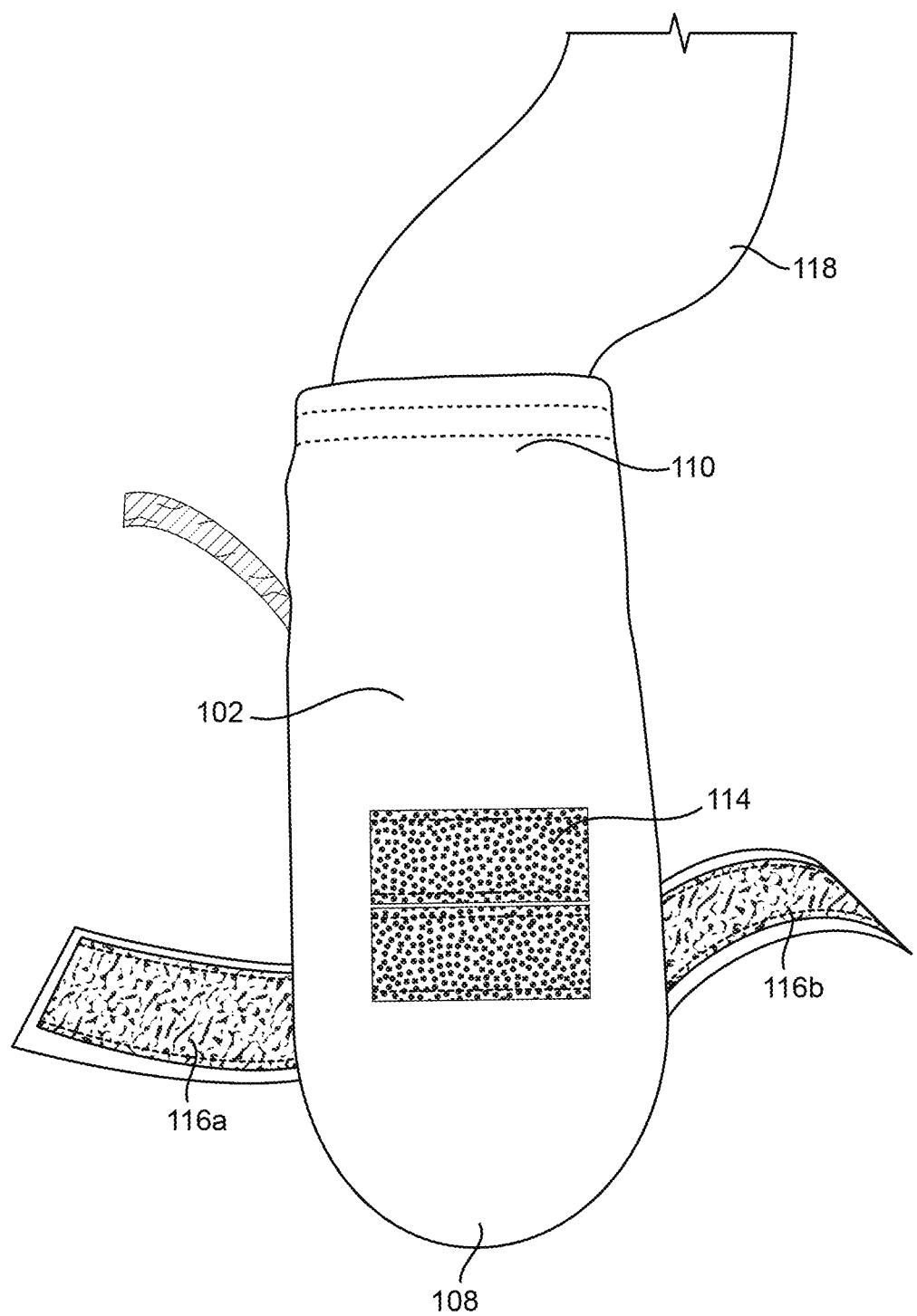
FIGS. 5A-5E illustrate perspective view of a sequential process for donning the boot onto a paw, in accordance with an embodiment of the present invention.

As shown in FIG. 5A, the boot has a generally tubular body member that fits onto a standard paw of a dog, cat, or other mammal having paws. The method 600 may further comprise a Step 604 of positioning a paw adjacent to the open end of the leg portion. A Step 606 includes sliding the paw into the body member until the paw fits snug in the paw portion of the body member, and the lower leg aligns with the lower leg portion of the body member. The open end of the lower leg portion receives the paw, and the body member is pulled until the paw engages the closed end of the paw portion.

In some embodiments, a Step 608 includes overlaying a sole over the bottom side of the paw portion. The durable, resilient composition of the sole creates a reinforcing protective barrier overlaying the body member. A Step 610 comprises slidably adjusting the sole across the bottom side and top side of the paw portion, whereby the sole is adjustable to accommodate differently sized and dimensioned paws. The sole is manipulated across the bottom side, and possible onto the top side of the paw portion to create optimal comfort for the animal, and maximum coverage of the paw—whether wide 200a paw or narrow paw 200b.

Figure 5B:
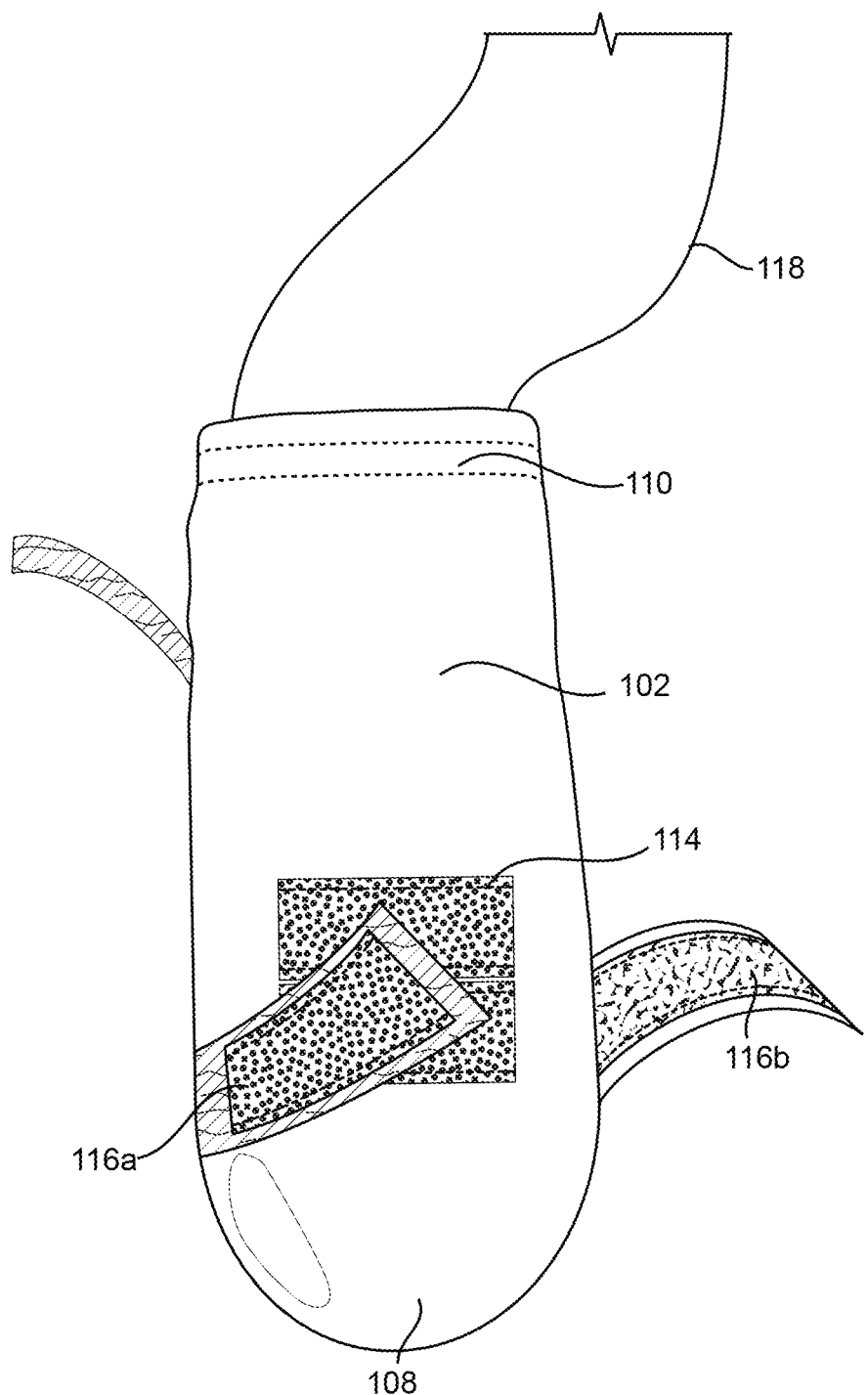
Figure 5C:
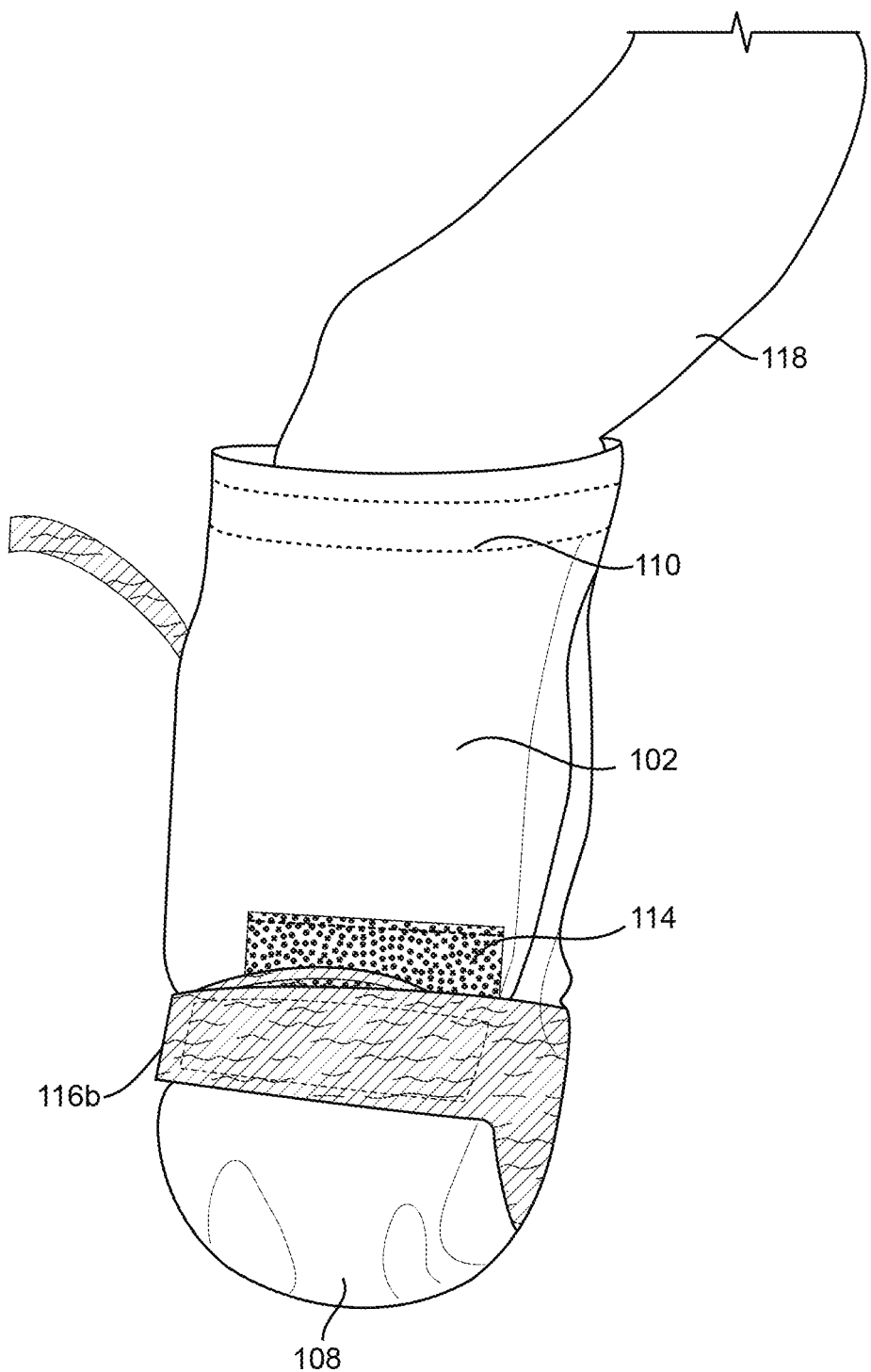

The method 600 may further comprise a Step 612 of wrapping a pair of hook and loop fastener straps around the paw portion of the body member. FIG. 5B shows a left side hook and loop fastener strap 116a attaching to the hook and loop fastener panel 114. FIG. 5C shows a right side hook and loop fastener strap 116b being pulled around the paw portion to attach to the hook and loop fastener panel 114. A Step 614 includes attaching the hook and loop fastener straps to a hook and loop fastener panel, whereby the hook and loop fastener straps fixedly fasten the sole over the paw portion, whereby the hook and loop fastener straps fixedly fasten the closed end of the paw portion to the paw.

Figure 5D:
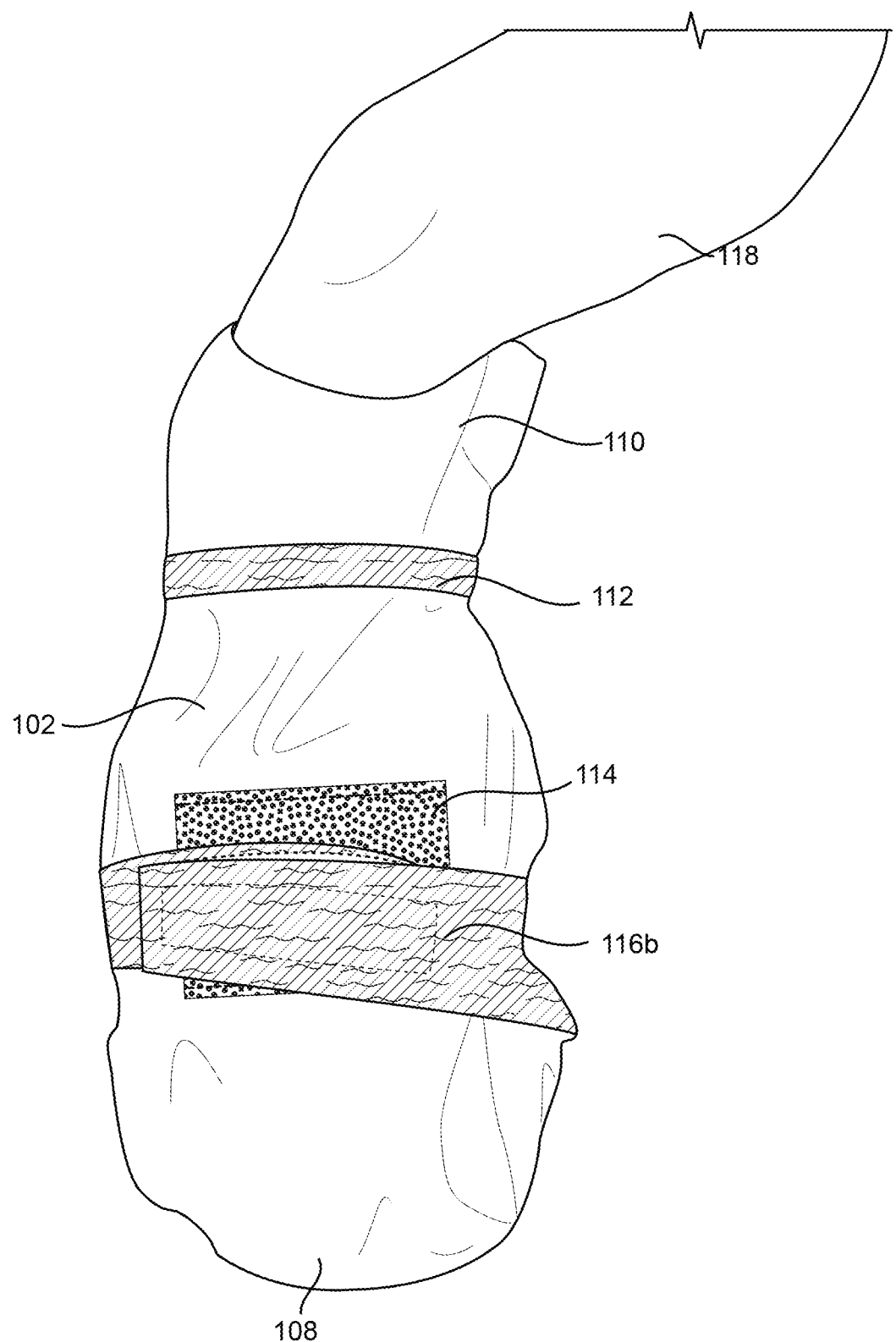
Figure 5E:
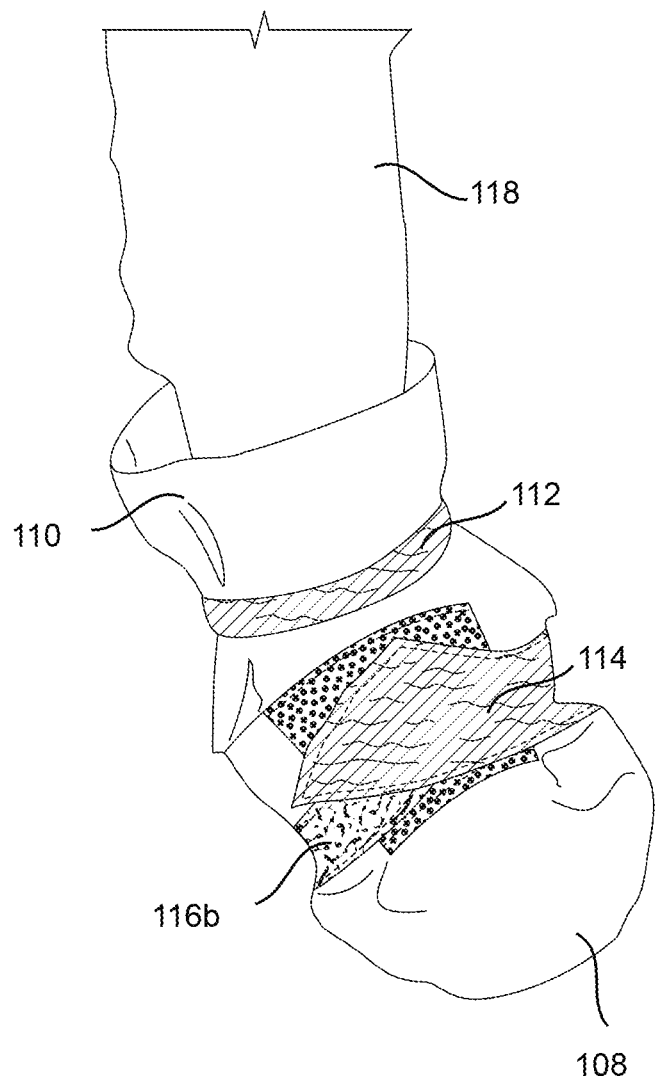

A final Step 616, shown in FIG. 5D, comprises wrapping a cable around the open end of the lower leg portion of the body member, whereby the lower leg portion secures to the lower leg. At this point, the boot is completely donned onto the paw, and the animal can walk freely and comfortable with the paw optimally protected (FIG. 5E). The boot is removed, simply by detaching the hook and loop fastener panel straps 116a-b and the cable; and then pulling the boot off the paw. The resilient configuration of the boot allows for hand and spot washing and compact stowage when not in use.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A size-adjustable animal paw boot, the boot comprising:
   a body member defined by a paw portion having a bottom side, a top side, and a closed end, the paw portion being operative to surround the paw of the animal, the body member further being defined by a lower leg portion having an open end, the lower leg portion operative to surround the lower leg of the animal;
   a cable joined with the body member, the cable being operable to at least partially wrap around the open end of the lower leg portion,
   whereby the lower leg portion of the body member secures to the lower leg;
   a hook and loop fastener panel affixed to the top side of the paw portion;
   a pair of hook and loop fastening straps arranged in a V-shape attached to the bottom side of the paw portion, wherein a tip of the V-shaped hook and loop fastening straps extends to a front portion of the body member and a pair of ends of the V-shaped hook and loop fastening straps extend to substantially a rear portion of the hook and loop fastener panel, such that the pair of ends of the V-shaped hook and loop fastening straps may be folded and pulled back before attachment to the hook and loop fastener panel to draw the paw boot snugly around the paw of the animal;
   a sole attached to the bottom side of the paw portion such that the sole is covering a front portion of the V-shaped hook and loop fastening straps, the sole being defined by a resilient material,
   whereby the sole is adjustable to accommodate the size and dimensions of the paw; and
   the pair of hook and loop fastener straps joined to the sole, the fastener straps operable to wrap
   around the body member and detachably attach to the hook and loop fastener panel,
   whereby the hook and loop fastener straps fixedly fasten the sole over the paw portion,
   whereby the hook and loop fastener straps fixedly fasten the closed end of the paw portion to the paw.

2. The boot of claim 1, wherein the body member is defined by a tubular shape.

3. The boot of claim 1, wherein the body member comprises a resilient material.

4. The boot of claim 1, wherein the cable joins with the lower leg portion of the body member.

5. The boot of claim 1, wherein the cable is flexible.

6. The boot of claim 1, wherein the hook and loop fastener panel is affixed to the top side of the paw portion.

7. The boot of claim 1, wherein the sole overlays the bottom side of the paw portion.

8. The boot of claim 1, wherein the sole comprises a durable, friction pad material.

9. The boot of claim 1, wherein the sole comprises rubber.

10. A size-adjustable animal paw boot, the boot consisting of:
   a tubular body member defined by a paw portion having a bottom side, a top side, and a closed end, the paw portion being operative to surround the paw of the animal, the body member further being defined by a lower leg portion having an open end, the lower leg portion operative to surround the lower leg of the animal;
   a flexible cable joined with the lower leg portion of the body member at a cable anchor, the cable being operable to at least partially wrap around the open end of the lower leg portion,
   whereby the lower leg portion of the body member secures to the lower leg;
   a hook and loop fastener panel affixed to the top side of the paw portion;
   a pair of hook and loop fastening straps arranged in a V-shape attached to the bottom side of the paw portion, wherein a tip of the V-shaped hook and loop fastening straps extends to a front portion of the body member and a pair of ends of the V-shaped hook and loop fastening straps extend to substantially a rear portion of the hook and loop fastener panel, such that the pair of ends of the V-shaped hook and loop fastening straps may be folded and pulled back before attachment to the hook and loop fastener panel to draw the paw boot snugly around the paw of the animal;
   a sole attached to the bottom side of the paw portion such that the sole is covering a front portion of the V-shaped hook and loop fastening straps, the sole being defined by a resilient material,
   whereby the sole is adjustable to accommodate the size and dimensions of the paw; and
   a pair of hook and loop fastener straps joined to the sole, the fastener straps operable to wrap around the body member and detachably attach to the hook and loop fastener panel,
   whereby the hook and loop fastener straps fixedly fasten the sole over the paw portion,
   whereby the hook and loop fastener straps fixedly fasten the closed end of the paw portion to the paw.

11. The boot of claim 10, wherein the body member comprises a resilient material.

12. The boot of claim 10, wherein the body member comprises a breathable material.

13. The boot of claim 10, wherein the hook and loop fastener panel is defined by a rectangular shape.

14. The boot of claim 10, wherein the sole overlays the bottom side of the paw portion.

15. The boot of claim 10, wherein the sole comprises a durable, rubber, friction pad material.

16. A method for donning an animal paw boot, the method comprising:
   providing a paw boot, the paw boot comprising a body member defined by a paw portion having a bottom side, a top side, and a closed end, the body member further being defined by a lower leg portion having an open end;
   positioning a paw adjacent to the open end of the leg portion;
   sliding the paw into the body member until the paw fits snug in the paw portion of the body member, and the lower leg aligns with the lower leg portion of the body member;
   attaching a hook and loop fastener panel to the top side of the paw portion;
   attaching a pair of hook and loop fastening straps arranged in a V-shape attached to the bottom side of the paw portion, wherein a tip of the V-shaped hook and loop fastening straps extends to a front portion of the body member and a pair of ends of the V-shaped hook and loop fastening straps extend to substantially a rear portion of the hook and loop fastener panel, such that the pair of ends of the V-shaped hook and loop fastening straps may be folded and pulled back before attachment to the hook and loop fastener panel to draw the paw boot snugly around the paw of the animal;
   attaching a sole to the bottom side of the paw portion, the sole being defined by a resilient material;
   wrapping a pair of hook and loop fastener straps around the paw portion of the body member;
   attaching the hook and loop fastener straps to a hook and loop fastener panel,
   whereby the hook and loop fastener straps fixedly fasten the sole over the paw portion,
   whereby the hook and loop fastener straps fixedly fasten the closed end of the paw portion to the paw; and
   wrapping a cable around the open end of the lower leg portion of the body member, whereby the lower leg portion secures to the lower leg.

* * * * *